United States Patent Office 2,830,964

Patented Apr. 15, 1958

1

2,830,964

PROCESS OF PRODUCING ETHYLENE OXIDE METHYLOL PHOSPHORUS POLYMERS, PRODUCTS OBTAINED AND AQUEOUS COMPOSITIONS THEREOF

Austin L. Bullock, Wilson A. Reeves, and John D. Guthrie, New Orleans, La., assignors to the United States of America as represented by the Secretary of Agriculture No Drawing. Application June 17, 1955
Serial No. 516,345

8 Claims. (Cl. 260—29.4)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to 2-hydroxylalkyl ethers of methylol phosphorus compounds of the formula

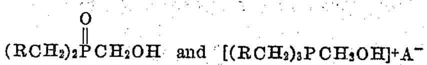

where A represents a monovalent anion, R represents OH or a radical produced by the reaction of a $PCH_2OH$ group with a compound capable of reacting with a $PCH_2OH$ group. More particularly, this invention provides the ethers produced by an addition reaction, between a phosphorus compound of the above formula and an epoxy compound of the formula

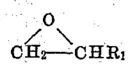

where $R_1$ represents a hydrogen atom or an organic radical, in which reaction at least one $PCH_2OH$ group of the phosphorus compound combines with at least one ethylene oxide group of the epoxy compound, to produce a 2-hydroxyalkyl ether group in accordance with the equation:

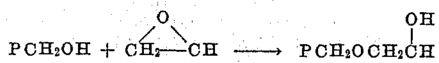

The ethers provided by this invention range from water soluble liquids, through water soluble or water dispersible solids, organic solvent soluble or dispersible solids, heat curable polymers, to insoluble infusible resins. They are generally useful wherever cross-linked polymers or prepolymers are useful; and in such a connection, are characterized by clear light colors and a resistance to burning. The lower molecular weight ethers are particularly useful as materials for producing a wide variety of 2-hydroxyalkyl ether-modified methylol phosphorus polymers that have a particular affinity for water and other polar liquids. The lower molecular weight ethers produced by reacting tetrakis(hydroxymethyl) phosphonium chloride and tris(hydroxymethyl) phosphine oxide with epichlorohydrin or epibromohydrin are valuable as components of aqueous textile treating compositions consisting essentially of resin forming reactants of nitrilo methylol-phosphorus polymers. When they are formed in situ by the reaction of epichlorohydrin with the phosphorus components of the textile treating compositions, they materially extend the working life of the textile treating compositions by stabilizing them against polymerization at ordinary application and/or storage temperature.

Prior work has resulted in the development of a variety of polymers capable of being produced by condensation and/or esterification reactions involving tetrakis(hydroxymethyl) phosphonium chloride, which has the formula $(HOCH_2)_4PCl$, and is abbreviated THPC, and/or tris(hydroxymethyl) phosphine oxide, which has the formula $(HOCH_2)_3PO$, and is abbreviated THPO. The methylol-phosphorus, i. e., $PCH_2OH$ groups, of each of these compounds are capable of either: (1) condensing with a compound which is capable of condensing with formaldehyde; or, (2) being esterified by an esterifying agent which is capable of esterifying methanol.

The polymers capable of being produced by condensation and/or esterification reactions of the polyfunctional phosphorus compounds can be produced in the form of cross-linked polymers or thermosetting resins; and, hereinafter, these polymers are referred to by the term "methylol-phosphorus" polymers or resins. The compounds capable of either condensing with formaldehyde or esterifying methanol are hereinafter referred to by the term "methylol-reacting compounds."

The methylol-phosphorus polymers are characterized by recurring structural units containing phosphorus atoms in radicals of the group $(—CH_2)_4PCl$ and $(—CH_2)_3PO$.

Methylol-phosphorus alkyds are produced by reacting at least one of the phosphorus compounds with at least one polycarboxylic acid esterifying agent; and such polymers are more fully described in copending application Serial No. 393,020 of November 18, 1953. Phenolic methylol-phosphorus polymers are produced by reacting at least one of the phosphorus compounds with at least one phenolic compound; and such polymers are more fully described in copending application Serial No. 421,212, filed April 5, 1954.

The methylol-phosphorus polymers are inter-reactable. For example, a further polymerizable polymer of THPC with a nitrilo compound such as melamine, can be reacted with, for example, a phenolic compound such as bromohydroquinone, or for example, a further polymerizable polymer of THPO with a polycarboxylic acid esterifying agent such as phthalic anhydride, to produce, in the first instance, a methylol-phosphorus polymer containing chemically bound residues of both melamine and bromohydroquinone, and in the second instance, a methylol-phosphorus polymer containing chemically bound residues of both melamine and phthalic acid, in addition to the residues of the phosphorus compounds.

Certain nitrogen containing methylol-phosphorus polymers, which are hereinafter referred to as "nitrilo" methylol-phosphorus polymers or resins, are particularly useful as textile flammability retardants. These resins are adapted to being partly or completely formed within the textile by impregnating the textile with an aqueous solution or dispersion of their resin forming reactants, and causing the reactants to react in situ until an insolubilized resin is produced. The nitrilo methylol-phosphorus polymers are capable of being produced by condensing at least one of the polyfunctional phosphorus compounds, with the elimination of water, with at least one organic nitrogen compound having a molecular weight of not more than about 800 and containing at least one trivalent nitrogen atom and at least two members of the group H and $CH_2OH$ attached to trivalent nitrogen atoms. Methods of producing the nitrilo methylol-phosphorus polymers and employing them to reduce the flammability of textiles are more completely described in copending patent applications, Serial No. 378,437, filed September 3, 1953, now Patent No. 2,809,941; Serial No. 393,021, now Patent No. 2,772,188; Serial No. 393,023, filed November 18, 1953, now Patent No. 2,795,569; and Serial No. 467,898, filed November 9, 1954. The nitrilo methylol-phosphorus polymers are cross-linked phosphorus and nitrogen containing polymers in which the recurring structural units each contains a phosphorus atom that is a component of a radical of the group $(—CH_2)_4PCl$ and $(—CH_2)_3PO$ and is linked to at least two trivalent nitrogen atoms by connecting structures of the group $—CH_2—$ and $$—CR_2OCR_2—$$

where R is a member of the group hydrogen and alkyl radicals. The nitrilo methylol-phosphorus polymers produced from resin forming reactants containing the 2-hydroxyalkyl ethers of the present invention are modified in that some of the phosphorus atoms are also linked to structures of the formula $$—CH_2OCH_2\overset{OH}{\overset{|}{C}}H—$$

In general, in accordance with the present invention ethers are produced by reacting a phosphorus compound of the formula $$(RCH)_2\overset{O}{\overset{\|}{P}}CH_2OH \text{ and } [(RCH_2)_3PCH_2OH]^+A^-$$

where A represents a monovalent anion, R represents OH or a radical produced by the reaction of a $PCH_2OH$ group with a compound capable of reacting with a $PCH_2OH$ group, with an ethylene oxide compound of the formula $$CH_2\overset{O}{—}CHR_1$$

where $R_1$ represents a hydrogen atom or an organic radical so that at least one $PCH_2OH$ group of the phosphorus compound adds to a $$CH_2\overset{O}{—}CH$$

group of an ethylene oxide compound to form a $$PCH_2OCH_2\overset{CH}{\overset{|}{C}}H$$

group.

The reaction is very general in nature. The reactants can each be one or more members of a broad class of compounds. No catalysts or solvents are required, but a wide variety of catalysts and/or solvents can be employed if desired.

Suitable phosphorus compounds include tris(hydroxymethyl) phosphine oxide, a phosphonium salt of the formula $[(HOCH_2)_4P]^+A^-$ in which A represents a monovalent anion, and the products of reacting either the phosphine oxide or the phosphonium salt with a "methylol reacting" compound (i. e. a compound capable of reacting with a $PCH_2OH$ group) to produce a derivative that retains at least one $PCH_2OH$ group. The phosphonium chloride, THPC, of the formula $(HOCH_2)_4PCl$, is a readily obtainable phosphonium salt, and is the preferred salt for employment in the present process. However, by the usual procedures for replacing the anion of such an onium salt, the phosphonium chloride can readily be converted to and employed in the form of, for example: the phosphonium hydroxide $(HOCH_2)_4POH$, the phosphonium acetate $(HOCH_2)_4POAc$, the phosphonium dihydrogen phosphate $$(HOCH_2)_4PO\overset{O}{\overset{\|}{P}}(OH)_2—$$

or the like phosphonium salt. The methylol phosphorus group containing derivatives of the phosphine oxide or the phosphonium salt can be a substantially monomeric product of reacting the phosphorus compound with at least one methylol reacting compound which is monofunctional in its capacity to react with $PCH_2OH$ groups, so that from about 1 to 2 moles of the methylol reacting compound combines with each mole of the phosphorus compound. Illustrative examples include the products of so reacting the phosphine oxide and/or the phosphonium salt with at least one: secondary amines such as diethylamine, N-vinyl cyclohexylamine, or the like; N-substituted amides such as N-methyl acrylamide, N-N'-trimethyl pinic acid diamide, N-propyl benzamide and the like; acids such as stearic acid, pinonic acid, monobutyl phthalate, and the like; and the like monofunctional reactants. The methylol phosphorus containing derivative of the phosphine oxide or the phosphonium salt can be a polymeric product produced by reacting the phosphorus compound with a compound which is polyfunctional in its capacity to react with methylol phosphorus groups, and terminating the reaction before all of the methylol phosphorus groups have reacted, i. e., the methylol phosphorus containing derivative can be a further polymerizable "methylol phosphorus" polymer. Illustrative examples include the further polymerizable nitrilo methylol-phosphorus polymer such as the polymer of THPC and methylolmelamine; the methylol-phosphorus alkyds such as the polymer of THPC and chlorendic acid; and the methylol-phosphorus phenolic polymers such as the polymer of THPC and resorcinol, described in the above referred to copending applications. Mixtures of THPC and THPO predominating in THPC are preferred phosphorus compounds for employment in the present process.

Suitable ethylene oxide compounds include monomeric and polymeric compounds which contain at least one terminal $$CH_2\overset{O}{—}CH$$

group. Illustrative examples include epichlorohydrin, epibromohydrin, ethylene oxide, the polyethylene oxides, and the homologs and analogs of ethylene oxide in which the $$CH_2\overset{O}{—}CH$$

group is attached to a hydrocarbon radical such as methyl, phenyl, capryl or the like radical.

The proportions of the phosphorus compounds and the ethylene oxide compounds can be varied widely from a mixture containing almost trace amounts of one reactant to a mixture containing almost trace amounts of the other. Where a catalyst is desired, either an acidic or basic catalyst can be employed. Suitable acidic catalysts include organic or inorganic acids such as hydrochloric, phosphoric, acetic, butyric and the like acids. Suitable basic catalysts include the alkali metal carbonates or bicarbonates, ammonia, organic amines such as trimethylamine, quaternary ammonium hydroxides such as quaternary metal ammonium hydroxide and the like. The reaction can be conducted in the absence of a solvent or in the presence of a liquid which is appreciably miscible with both reactants. The liquid employed can be one which is reactive with the phosphorus compounds or with the forming phosphorus compound-ethylene oxide ether, where it is desired to so modify the ethers produced. Water is a particularly suitable solvent for the reaction.

The nitrilo methylol-phosphorus polymers have proven to be particularly good textile flammability retarding agents. In that connection, the polymers are usually applied to the textile in the form of an aqueous textile treating composition which consists essentially of an aqueous solution or dispersion containing as resin forming reactants: (A) At least one polyfunctional methylol-phosphorus reactant of the group consisting of THPC, THPO, and the product of reacting THPC or THPO with a methylol reactive compound to produce a derivative that retains at least two $PCH_2OH$ groups; and (B) at least one polyfunctional nitrilo reactant which is an aliphatic compound containing at least two members of the group consisting of H and $CH_2OH$ groups attached to trivalent nitrogen atoms. The textiles to which the treating compositions are applied are then heated at a temperature of from about 130° to 170° C. for from about 2 to 12 minutes, to evaporate the volatile components of the treating composition and to substantially completely polymerize the resin forming reactants. We have now discovered that such textile treating compositions are materially improved in that they are stabilized towards polymerization at the ordinary application and/or storage temperatures, by the incorporation of from about 3 to 15% of the weight of the resin forming reactants of an epichlorohydrin, or epibromohydrin ether of THPC or THPO containing at least one $$PCH_2OCH_2CH(OH)CH_2Cl$$

or $PCH_2OCH_2CH(OH)CH_2Br$ group.

The following examples are illustrative of the details of at least one method of practicing the invention.

*Example 1*

5 parts of THPC and 10.5 parts of epichlorohydrin were mixed and heated under reflux until an exothermic reaction began. At this point heating was discontinued and the reaction was allowed to proceed until heat was no longer evolved and the product was cool. The product was a viscous amber colored liquid which gave a light amber, water soluble solid after distillation of volatile components under reduced pressure.

*Example 2*

5 parts of THPC and 35.4 parts of epichlorohydrin were treated exactly as in Example 1. The final product was a light amber solid, insoluble in water, ethanol, toluene and benzene.

*Example 3*

40 parts of THPC and 78 parts of epichlorohydrin were heated under reflux until an exothermic reaction began. External heat was then removed and the reaction slowed down by cooling the reaction vessel with an ice water bath until the reaction product appeared homogeneous. The product was viscous, yellow liquid which became a brittle, hydroscopic, light amber solid, soluble in water and insoluble in ethanol after distillation of volatile components under reduced pressure. This solid contained 10.07% phosphorus and 21.37% chlorine. After this solid was ground in and extracted with ethanol to remove unreacted product, it contained 10.06% phosphorus and 21.36% chlorine.

*Example 4*

16.6 parts of THPC, 10 parts of trimethylolmelamine, 10.5 parts of urea, and 4.2 parts of triethanolamine were dissolved in 54 parts of water. After solution was effected, 5 parts epichlorohydrin were dispersed in the solution by vigorous stirring to form a clear liquid. This liquid was much more stable at room temperature than similar ones that did not contain epichlorohydrin. However, it began to gel after about 36 hours at about 37° C. and gradually hardened into a grindable resin. The resin was insoluble in all common solvents and would not support combustion.

*Example 5*

A clear, stable liquid made in accordance with Example 4 was used to treat 8 oz. cotton twill. The fabric was padded in the solution using a very tight squeeze roll setting. It was then dried 5 minutes at 85° C. then cured by heating 5 minutes at 140° C. and washed in water to remove uncombined salts. When air-dried the fabric had a resin add-on of 16.5%, and was very highly flame-resistant, glow-resistant, shrink-resistant, mildew and rot-resistant, and wrinkle-resistant.

*Example 6*

20 parts THPC were mixed with 14 parts of epibromohydrin. This mixture was treated exactly as were the reactants described in Example 3. The final product was a pale yellow solid, partly soluble in water, containing 11.42% phosphorus, 3.05% chlorine and 26.73% bromine. The water insoluble portion of the solid contained 11.78% phosphorus, 2.82% chlorine and 26.11% bromine.

*Example 7*

20 parts of THPC and 14 parts of epibromohydrin were heated together to promote reaction and the reaction rate was then controlled with an ice water bath. The product was a viscous, yellow liquid, soluble in water. To 5 parts of this product was added enough $NH_4OH$ to adjust the pH to 8. This produced a solid which was recovered by filtration after dilution of the liquid with 5 parts of water. The solid product was a pale yellow material, insoluble in water and containing 14.38% phosphorus, 5.27% nitrogen and 32.26% bromine.

*Example 8*

10 parts of THPC and 6.3 parts of styrene oxide (1,2 epoxyethyl benzene) were heated with stirring on a water bath for 15 minutes. After cooling, the phosphorus containing product was a very viscous, faintly yellow liquid, soluble in water and slightly soluble in benzene.

We claim:

1. An ether selected from the group consisting of compounds having the formula $$(RCH_2)_2\overset{O}{\overset{\|}{P}}CH_2OCH_2\overset{OH}{\overset{|}{C}}HR_1$$

and $$[(RCH_2)_3PCH_2OCH_2\overset{OH}{\overset{|}{C}}HR_1]^+A^-$$

where A represents a monovalent anion, R represents a member selected from the group consisting of —OH and a radical produced by the reaction of a $—PCH_2OH$ group with a compound selected from the group consisting of amines and phenols, and $R_1$ is a radical selected from the group consisting of H—, $—CH_2Cl$, $—CH_2Br$, methyl, phenyl, and capryl.

2. A process for producing an ether which comprises reacting a phosphorus compound selected from the group consisting of $$(RCH_2)_2\overset{O}{\overset{\|}{P}}CH_2OH$$

and $$[(RCH_2)_3PCH_2OH]^+A^-$$

with an ethylene oxide compound of the formula, $$\overset{O}{\overbrace{CH_2CHR_1}}$$

where R represents a member selected from the group consisting of —OH and radical produced by the reaction of a $—PCH_2OH$ group with a compound selected from the group consisting of amines and phenols, A represents a monovalent anion, and $R_1$ represents a radical selected from the group consisting of H—, $—CH_2Cl$, $—CH_2Br$, methyl, phenyl, and capryl.

3. An aqueous textile treating composition comprising a homogeneous aqueous mixture consisting essentially of: water; at least one polyfunctional methylol-phosphorus reactant of the group consisting of tetrakis(hydroxymethyl) phosphonium chloride, tris(hydroxymethyl) phosphine oxide, and the product of reacting said methylol-phosphorus compound with a compound selected from the group consisting of amines and phenols, to produce a derivative that retains at least two $PCH_2OH$ groups; a monomeric aliphatic amino compound containing a plurality of radicals selected from the group consisting of H and $CH_2OH$ radicals; and at least about 3% of the weight of the phosphorus and amino reactants of at least one member of the group consisting of an epibromohydrin ether of tetrakis-(hydroxymethyl) phosphonium chloride containing at least one $PCH_2OCH_2CH(OH)CH_2Br$ group and an epichlorohydrin ether of tetrakis(hydroxymethyl) phosphonium chloride containing at least one $$PCH_2OCH_2CH(OH)CH_2Cl$$

group.

4. An epichlorohydrin ether of tetrakis(hydroxymethyl) phosphonium chloride containing at least one $$PCH_2OCH_2CH(OH)CH_2Cl$$

group.

5. A cross-linked polymer produced by reacting tetrakis-(hydroxymethyl) phosphonium chloride, a water soluble methylolmelamine, urea and epichlorohydrin.

6. An epibromohydrin ether of tetrakis(hydroxymethyl) phosphonium chloride containing at least one $$PCH_2OCH_2CH(OH)CH_2Br$$

group.

7. A styrene oxide ether of tetrakis(hydroxymethyl) phosphonium chloride containing at least one

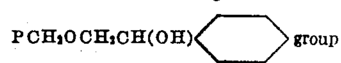

8. An aqueous textile treating composition comprising a homogeneous aqueous mixture consisting essentially of water, tetrakis (hydroxymethyl) phosphonium chloride, a water soluble methylolmelamine, urea and an epichlorohydrin ether of tetrakis(hydroxymethyl) phosphonium chloride containing at least one $$PCH_2OCH_2CH(OH)CH_2Cl$$

group.

References Cited in the file of this patent

UNITED STATES PATENTS 2,668,096 Reeves et al. ---------- Feb. 2, 1954

OTHER REFERENCES

Whitmore: "Organic Chemistry," 2nd. ed., D. Van Nostrand W., Inc., New York, N. Y., 1951, page 311.